United States Patent [19]

Pritchett

[11] 4,228,250

[45] Oct. 14, 1980

[54] BLENDS OF HYDROLYZED ETHYLENE-VINYL ACETATE RESINS HAVING INCREASED IMPACT STRENGTH

[75] Inventor: Ervin G. Pritchett, Cincinnati, Ohio

[73] Assignee: National Distillers and Chemical Corporation, New York, N.Y.

[21] Appl. No.: 52,890

[22] Filed: Jun. 28, 1979

[51] Int. Cl.$^2$ ............................................. C08L 29/04
[52] U.S. Cl. .................................... 525/57; 525/196; 525/222
[58] Field of Search ......................... 525/57, 196, 222

[56] References Cited

U.S. PATENT DOCUMENTS

| | | | |
|---|---|---|---|
| 3,100,150 | 8/1963 | Chismar et al. | 525/57 |
| 3,298,855 | 1/1967 | Helin et al. | 117/76 |
| 3,847,728 | 11/1974 | Hirata et al. | 525/222 |
| 3,887,649 | 6/1975 | Takida et al. | 525/58 |
| 3,975,463 | 8/1976 | Hirata et al. | 525/57 |

*Primary Examiner*—Carman J. Seccuro
*Attorney, Agent, or Firm*—Kenneth D. Tremain

[57] ABSTRACT

Resin blends containing hydrolyzed ethylene-vinyl acetate resin and demonstrating improved impact-resistance properties compared to the unblended hydrolyzed ethylene-vinyl acetate resin are obtained by blending (a) as host resin, a copolymer/terpolymer of ethylene, vinyl acetate and vinyl alcohol in which ethylene is present at from about 2 to about 60 weight percent, vinyl acetate is present at from 0 to about 10 weight percent and vinyl alcohol is present at about 98 to about 40 weight percent, with (b) an impact-resistance-increasing amount of an impact modifying resin which is a partially hydrolyzed ethylene-vinyl acetate copolymer in which ethylene is present at about 25 to about 70 weight percent, vinyl acetate is present at about 20 to about 70 weight percent and vinyl alcohol is present at about 0.5 to about 25 weight percent.

9 Claims, No Drawings

BLENDS OF HYDROLYZED ETHYLENE-VINYL ACETATE RESINS HAVING INCREASED IMPACT STRENGTH

BACKGROUND OF THE INVENTION

1. Field of the Invention

This invention relates to the field of resin blends containing partially hydrolyzed ethylene-vinyl acetate (PHEVA) resin as an impact modifier for brittle, hydrolyzed ethylene-vinyl acetate (HEVA) resin containing at least about 40 weight percent interpolymerized vinyl alcohol and no more than about 10 weight percent interpolymerized vinyl acetate.

2. Description of the Prior Art

Hydrolyzed ethylene-vinyl acetate resins containing in interpolymerized form from about 2 to about 60 weight percent ethylene, from about 98 to about 40 weight percent vinyl alcohol and no more than about 10 weight percent of vinyl acetate provide moldings which exhibit excellent oil-resistance, stiffness, hardness, tensile strength, flexural strength, compression strength, abrasion resistance and antistatic charge. Unfortunately, however, these resins possess such a low level of impact-resistance that they are for the most part excluded from engineering applications where high impact strength is an indispensable requirement. Thus, for example, brittle, hydrolyzed ethylene-vinyl acetate resins of the foregoing type, due to their poor impact-resistance are generally unsuitable molding materials for such important commercial applications as electric switch covers, knobs or cabinets, machine parts such as pulleys, rollers, bars, gears, cams or bobbins and automotive parts subject to dynamic stress loads.

It has been acknowledged by Takida et al. (U.S. Pat. No. 3,887,649) that past attempts to remedy the low impact-resistance deficiency of hydrolyzed ethylene-vinyl acetate resins by incorporating therein a synthetic rubber such as styrene-butadiene copolymer or acrylonitrile-butadiene copolymer have not met with success. For example, while Gardiner et al. (U.S. Pat. No. 3,585,177) and Coates et al. (U.S. Pat. No. 3,549,727) propose the use of nitrile rubbers as impact modifiers for brittle, hydrolyzed ethylene-vinyl acetate resin, experience with these modifiers in simple blends of the hydrolyzed resin has been unfavorable due to the tendency of the blends to separate into the component resins and/or develop an unacceptable degree of opacity. Takida et al. also acknowledge that while blends of hydrolyzed ethylene-vinyl acetate resin and ethylene-vinyl acetate resin improves impact resistance at normal temperature "to some extent", such blends remain unsatisfactory since the tensile strength and flexural strength are remarkably reduced and impact-resistance at low temperature is insufficient. Takida et al. propose the improvement of the impact-resistance of hydrolyzed ethylene-vinyl acetate resins by the addition thereto of a block-copolymerized polyester-polyether elastomer having a melting point of crystalline region of 150° to 230° C. and an impact resilience of not less than 50%. The related resin blends of Japan Kokai No. 75-18, 553 (1975) (Chem. Abs. 83 8044) cites the modification of hydrolyzed ethylene-vinyl acetate resin with a polyester elastomer. The hydrolyzed ethylene-vinyl acetate resin impact modifier of Japan Kokai No. 74-33,941 (1974) (Chem. Abs. 84 60595) is polyurethane while in Japan Kokai No. 76-05, 354 (1976) (Chem Abs. 84 136723) it is a mixture of low density polyethylene and glycerol. Japan Kokai No. 75-23, 443 (1975) (Chem. Abs. 83 80478) describes transparent, impact-resistant moldings of hydrolyzed ethylene-vinyl acetate resin modified with a butadiene-methyl methacrylate-styrene graft terpolymer. The latter resin, being organic solvent sensitive, can easily be lost under molded part use conditions and for this reason is an undesirable ingredient when the hydrolyzed ethylene-vinyl acetate resin blend is employed in molding operations. Nohara et al. (U.S. Pat. No. 3,882,259) describe a laminated sheet in which the ethylene-vinyl alcohol copolymer intermediate layer contains an ionomer resin and/or an ethylene-vinyl acetate copolymer for the purpose of improving the resistance to permeation of gas and moisture and to improve the bonding force between the layers. Patentees are completely silent with respect to adding an impact-resistance modifier. Fuksushima et al. (U.S. Pat. No. 3,890,267) describe glass fiber-modified hydrolyzed ethylene-vinyl acetate resins; related materials are the so-called "GL Resins" (Kawaguchi et al., JAPAN PLASTICS, November-December 1974, pages 6–14 and January-February 1975, pages 11–15). In addition to lacking transparency, the impact-modifying effects of the glass fibers are to some extent lessened when the resins are processed by such techniques as injection molding as the high shear forces occurring in the extruder result in reducing the length of the glass fibers and hence reducing their contribution to impact-resistance.

The addition of several of the known impact modifiers is disadvantageous either in respect of negatively affecting an important property of the host resin, e.g., transparency, and/or being unsuited to certain processing operations, e.g., molding. Moreover, for the manufacturer of hydrolyzed ethylene-vinyl acetate resin, the addition of an impact modifier which is altogether entirely unrelated to the host resin is usually less than an ideal solution since it often requires maintaining inventory of a material which must be obtained from an outside source and as such, is beyond the manufacturer's direct control.

SUMMARY OF THE INVENTION

It has now been discovered that the impact-resistance of brittle, hydrolyzed ethylene-vinyl acetate copolymer can be dramatically improved by the addition thereto of an impact-resistance-increasing amount of a partially hydrolyzed ethylene-vinyl acetate resin. The resulting resin blends, in addition to possessing improved impact-resistance, retain excellent transparency and processability and as such, can be used in numerous applications for which the unalloyed resins are entirely unsuited, e.g., the production of useful articles by conventional extrusion, compression or transfer molding techniques.

Broadly stated, the resin blends of this invention comprise (a) as host resin, a hydrolyzed ethylene-vinyl acetate copolymer in which ethylene is present at from about 2 to about 60 weight percent, vinyl acetate is present at from 0 to about 10 weight percent, and vinyl alcohol is present at about 98 to about 40 weight percent, blended with (b) an impact-resistance-increasing amount of an impact modifying resin which is a partially hydrolyzed ethylene-vinyl acetate copolymer in which ethylene is present at about 25 to about 70 weight percent, vinyl acetate is present at about 20 to about 70 weight percent and vinyl alcohol is present at about 0.5 to about 25 weight percent.

A further advantage to the resin blends herein lies in the convenience of employing an impact modifier which is chemically closely related to the host resin. It is generally a simple enough matter for the manufacturer of the hydrolyzed ethylene-vinyl acetate host resin to additionally provide the partially hydrolyzed ethylene-vinyl acetate resin impact modifier through control of the degree of hydrolysis of the ethylene-vinyl acetate copolymer which is a starting material common to each of the aforesaid hydrolyzed resins.

DESCRIPTION OF THE PREFERRED EMBODIMENTS

Both resin components of the blends herein are well known materials and are derived from ethylene-vinyl acetate copolymers by such known and conventional procedures as alcoholysis, saponification or hydrolysis, the degree to which the vinyl acetate groups are converted to vinyl alcohol groups being controlled so as to provide the brittle host resin or the impact modifying resin.

In a preferred method, ethylene-vinyl acetate is hydrolyzed in the solid phase in the presence of an acidic or alkaline catalyst in a liquid reaction medium incorporating a low-boiling alcohol and, preferably, a hydrocarbon solvent (which acts as a swelling solvent in the reaction medium). The starting ethylene-vinyl acetate copolymer can contain small amounts, e.g., up to about 5 weight percent, of a third monomer as, for example, carbon monoxide, sulfur dioxide, methyl acrylate, n-butyl acrylate, hexanediol diacrylate, di-n-butyl maleate, diethyl itaconate, acrylic acid, methacrylic acid, fumaric acid and the like, and can be provided in any convenient solid form, e.g., sheeting, film, pellets, strands, fibers, fine particulate, etc. Since the hydrolyzed resin is to be subsequently blended it is desirable that the ethylene-vinyl acetate copolymer which is to be hydrolyzed be in a form which readily lends itself to the usual blending operations. Powders and pellets are therefore especially advantageous forms of resin.

The low-boiling alcohol which is the reactive component of the liquid alcoholysis reaction medium, can be any monohydric alcohol having up to 4 carbon atoms, i.e., methanol, ethanol, n-propanol, isopropanol, n-butanol, secbutanol, isobutanol or tert-butanol. The primary alcohols, and especially methanol and ethanol, are preferred.

The hydrocarbon solvent can be a linear paraffin such as ethane, propane, n-butane, n-pentane, n-hexane, n-heptane, n-octane, n-decane, etc.; a branched paraffin hydrocarbon, for example, 2,2-dimethylbutane, 2,2,4-trimethylpentane, or 2,5-dimethylcyclopentane, cyclohexane, cyclooctane, or decahydronaphthalene; or an aromatic hydrocarbon such as benzene, toluene, xylene-isomer, mixtures or the individual isomers thereof, ethyl-benzene, cumene, pseudocumene, cymene, diisopropylbenzene, etc. Aromatic hydrocarbons are preferred.

Any of a variety of alkaline or acidic materials can be utilized as catalysts for the alcoholysis reaction. The preferred catalyst is an alkali metal or alkaline earth metal alkoxide of the low-boiling alcohol incorporated in the reaction medium, e.g., lithium methoxide, sodium methoxide, sodium ethoxide, potassium isopropoxide, potassium tertbutoxide, magnesium ethoxide, etc. Alternative catalysts comprise the hydroxides of the alkali metal and alkaline earth metals, such as lithium hydroxide, sodium hydroxide, potassium hydroxide, magnesium hydroxide and calcium hydroxide.

The proportion of the ethylene-vinyl acetate copolymer alcoholyzed in the reaction medium can vary from as much as about 10:1 to as little as about 1:1,000 parts by weight of the copolymer: parts by weight of the entire medium. The low-boiling alcohol is present in the reaction medium in an amount at least stoichiometrically equivalent to the number of moles of the vinyl ester repeating units to be alcoholyzed. In the case of the hydrolyzed host resin component of the blends herein, the starting ethylene-vinyl acetate copolymer containing from about 2 to about 60 weight percent ethylene and from about 98 to about 40 percent vinyl acetate is hydrolyzed in the presence of an amount of low-boiling alcohol sufficient to provide a brittle hydrolyzed ethylene-vinyl alcohol resin containing from 0 to about 10 weight percent unreacted vinyl acetate. The preferred brittle, hydrolyzed ethylene-vinyl alcohol host resins contain from about 5 to about 50 weight percent ethylene, from 0 to less than about 5 weight percent vinyl acetate and from above about 95 to about 50 weight percent vinyl alcohol. For the impact modifier resin component of the blends of this invention, the starting ethylene-vinyl acetate copolymer containing from about 25 to about 70 weight percent ethylene and from about 75 to about 30 weight percent vinyl acetate is hydrolyzed with sufficient low-boiling alcohol to provide a partially hydrolyzed resin containing from 20 to about 70 weight percent residual vinyl acetate groups. The preferred impact modifier resins contain from about 30 to about 65 weight percent ethylene, from about 25 to about 65 weight percent vinyl acetate and from about 1 to about 20 weight percent vinyl alcohol.

The hydrolysis process is carried out at a temperature high enough to favor maximum alcoholysis rates but low enough to prevent substantial dissolution, coalescence, sticking, or agglomeration of the solid forms of the ethylene-vinyl acetate resin being alcoholyzed, in order that the hydrolyzed product is in substantially the same form as the original ethylene-vinyl acetate starting resin. Temperatures of from about 0° to about 150° C., preferably from about 30° to 100° C., can be utilized. The reaction can be carried out at atmospheric pressure, or alternatively, under applied pressures of up to about 5,000 p.s.i. It is sufficient if the ambient pressure is adequate to maintain the reaction medium in the liquid state at the particular reaction temperature chosen. Reaction times can also be broadly varied; thus, the alcoholysis can be carried out for periods of from about 1 second to about 2 hours, preferably from about 15 seconds to about 15 minutes. The ethylene-vinyl acetate copolymer is introduced into the alcoholysis medium with the temperature, pressure and reaction times regulated as aforesaid. The medium is desirably maintained substantially free of water and the reaction is carried out under a dry, preferably inert atmosphere. To maintain this condition, the reactants are dried prior to introduction into the reaction mixture by passage through a suitable solid desiccant such as, for example, an activated molecular sieve, or an activated alumina, or silica gel. The drying is conducted under anhydrous conditions, i.e., under a protective atmosphere of a dry, inert gas such as dry nitrogen, argon or helium. When the alcoholysis is completed to the extent desired (principally a function of the quantity of low-boiling alcohol employed), the hydrolyzed ethylene-vinyl acetate resin is removed from the alcoholysis medium. Adhering or absorbed solvent and catalyst residues are conveniently removed by washing with low-boiling alcohol, preferably containing sufficient weak acid to destroy the catalyst. Alternatively or subsequently, further washing can be accomplished with water, and the hydrolyzed product is then dried prior to blending.

The impact modifying resin is added to the host resin at a level which is sufficient to provide a significant increase in impact-resistance of the blend over the host resin alone and is generally proportionate to the amount of vinyl alcohol groups present in the latter. In general, the addition of from about 5 to about 30 weight percent of impact modifying resin by weight of host resin is sufficient to provide an appreciable increase in impact-resistance of the blend compared to that of the host resin alone. Blending of the resins can be carried out employing any of the known and conventional methods, e.g., the use of a Brabender Plastograph, Banbury mixer, calendering rolls, etc. An amount of alkali metal carboxylic acid salt up to about 50 parts per hundred, but preferably less than 40 parts per hundred can be present in the impact modifying resin as filler. This filler can represent the by-product metal acetate of the hydrolysis reaction, e.g., sodium acetate or potassium acetate resulting from alkali hydroxide hydrolysis. Conventional crosslinking agents for partially hydrolyzed ethylene-vinyl acetate resin, e.g., boric acid in amounts up to about 2 parts per hundred, but preferably less than about 1 part per hundred of this resin, can be added as a clarifying agent.

In the examples which follow, Example 1 illustrates the poor impact-resistance of hydrolyzed ethylene-vinyl acetate resin and Example 2 demonstrates the dramatic improvement in impact-resistance obtained in accordance with this invention. Example 3 demonstrates that ethylene-vinyl acetate copolymer as an impact modifier for hydrolyzed ethylene-vinyl acetate provides an improvement over the impact-resistance measurement for the latter resin alone but still results in an unacceptable blend. Examples 4 and 5 are further illustrative of the invention.

EXAMPLE 1

Discs 1¾ inch in diameter by 60 mils thick were compression molded from a hydrolyzed ethylene-vinyl acetate resin representing a 30:70 ethylene-vinyl acetate copolymer saponified to 2.4 percent residual vinyl acetate groups (96.6 percent hydrolysis). The molded discs were conditioned according to Procedure A of ASTM D-618 and impact tested with a Gardner Laboratories IG-1120M Falling Weight Impact Tester. Impact strength of the hydrolyzed ethylene-vinyl acetate was found to be only 0.3 in. lb./mil with brittle break.

EXAMPLE 2

Partially hydrolyzed ethylene-vinyl acetate was prepared in the melt as follows. 40 parts of a 57.7:42.3 ethylene-vinyl acetate copolymer with 0.1 part of 1:4 sulfur plus 2246 antioxidant (American Cyanamid Company) mixture were milled at 60 rpm under nitrogen in the roller blade equipped mixing chamber of a C.W. Brabender Plastograph with the mixer jacket temperature at 120° C. 1.56 parts of sodium hydroxide pellets, equivalent to 20 percent of the vinyl acetate in the starting copolymer, were added and followed by one part water as a temporary solvent. The mixture was milled for 15 minutes with maximum mix temperature 145° C. and final temperature 141° C. The product was considerably tougher than the original ethylene-vinyl acetate copolymer. The by-product sodium acetate was not removed but was retained as filler.

8 parts of the partially hydrolyzed ethylene-vinyl acetate resin prepared above were blended into 32 parts of the hydrolyzed ethylene-vinyl acetate resin of Example 1 in the Plastograph mixer at 60–50 rpm under nitrogen with a mixer jacket temperature of 150° C. Mixing speed was regulated to bring the mix to 165°–170° C. The product had an impact strength of 3.8 in. lb./mil with ductile failure. In the form of 10 mil film, the blend had fair clarity and good tear resistance.

EXAMPLE 3

To demonstrate the efficacy of partial hydrolysis of the ethylene-vinyl acetate in improving blends with hydrolyzed ethylene-vinyl acetate resin, the blending procedure of Example 2 was repeated except that the ethylene-vinyl acetate copolymer was not prehydrolyzed, that is, the blend resulting had 8 parts of 57.7:42.3 ethylene-vinyl acetate copolymer (unmodified) in 32 parts of the hydrolyzed resin of Example 1. The impact strength of this blend was 1.6 in. lb./mil, an improvement over that for hydrolyzed ethylene-vinyl acetate resin only. However, this blend was quite brittle and tended to shatter when broken. In the form of 10 mil film, the hydrolyzed ethylene-vinyl acetate resin/ethylene-vinyl acetate copolymer blend was opaque and had poor tear resistance.

EXAMPLE 4

Example 2 was repeated except that 0.05 part of boric acid as a 5 percent solution in water was added to the blend of partly hydrolyzed ethylene-vinyl acetate resin in hydrolyzed ethylene-vinyl acetate resin during mixing. This blend had an impact strength of 2.7 in. lb./mil, a slight loss compared to the product of Example 2; but in the form of 10 mil film, this blend had good clarity and very good tear resistance.

EXAMPLE 5

Example 4 was repeated except that the partly hydrolyzed ethylene-vinyl acetate resin had about half of the acetate groups saponified to hydroxyl and the by-product sodium acetate had been extracted. Original ethylene-vinyl acetate copolymer analysis was 42.3 percent vinyl acetate; that of the partly hydrolyzed ethylene-vinyl acetate resin was 22.4 percent vinyl acetate. The product blend had an impact strength of 2.5 in. lb./mil and, as 10 mil film, very low haze together with excellent clarity and tear resistance.

EXAMPLE 6

A hydrolyzed 14.8:85.2 ethylene-vinyl acetate copolymer had 27.7 percent hydroxyl and 0.71 percent residual vinyl acetate by analysis, together with a melt flow rate of 1.97 under condition E. The hydrolyzed copolymer, plasticized with 1.1 parts per hundred of glycerol, molded readily to 10 mil sheets which, however, were cloudy-translucent and very brittle.

When the hydrolyzed copolymer was modified by blending in 25 parts per hundred of the partly hydrolyzed ethylene-vinyl acetate of Example 2 (containing unremoved sodium acetate) a composition resulted which was quite tough and had very good tear resistance as film.

When the hydrolyzed copolymer was modified by blending in 25 parts per hundred of the half hydrolyzed ethylene-vinyl acetate of Example 5, the resulting composition as 10 mil film had excellent clarity, was very tough, had excellent tear resistance and exhibited very little to no blush upon creasing.

What is claimed is:

1. A resin blend demonstrating improved impact-resistance which comprises (a) as host resin, a hydrolyzed ethylene-vinyl acetate copolymer in which ethylene is present at from about 2 to about 60 weight percent, vinyl acetate is present at from about 0 to about 10 weight percent, and vinyl alcohol is present at about 98 to about 40 weight percent, blended with (b) an impact-resistance-increasing amount of an impact modifying resin which is a partially hydrolyzed ethylene-vinyl acetate copolymer in which ethylene is present at about 25 to about 70 weight percent, vinyl acetate is present at about 20 to about 70 weight percent and vinyl alcohol is present at about 0.5 to about 25 weight percent.

2. The resin blend of claim 1 in which host resin (a) contains from about 5 to about 50 weight percent ethylene, from 0 to less than about 5 weight percent vinyl acetate and from above about 95 to about 50 weight percent vinyl alcohol.

3. The resin blend of claim 1 in which impact modifying resin (b) contains from about 30 to about 65 weight percent ethylene, from about 25 to about 65 weight percent vinyl acetate and from about 1 to about 20 weight percent vinyl alcohol.

4. The resin blend of claim 1 in which the impact modifying resin (b) is present at from about 5 to about 30 weight percent of host resin (a).

5. The resin blend of claim 2 in which impact modifying resin (b) contains from about 30 to about 65 weight percent ethylene, from about 25 to about 65 weight percent vinyl acetate and from about 1 to about 20 weight percent vinyl alcohol.

6. The resin blend of claim 1 in which impact modifying resin (b) contains an alkali metal carboxylic acid salt.

7. The resin blend of claim 6 in which the alkali metal carboxylic acid salt is sodium acetate or potassium acetate.

8. The resin blend of claim 1 in which impact modifying resin (b) contains a crosslinking agent.

9. The resin blend of claim 8 in which the cross-linking agent is boric acid.

* * * * *